RE25063
Jan. 20, 1959      B. SCHIFFMAN      2,869,144
AUTOMOBILE ACCESSORY
Filed Sept. 8, 1953
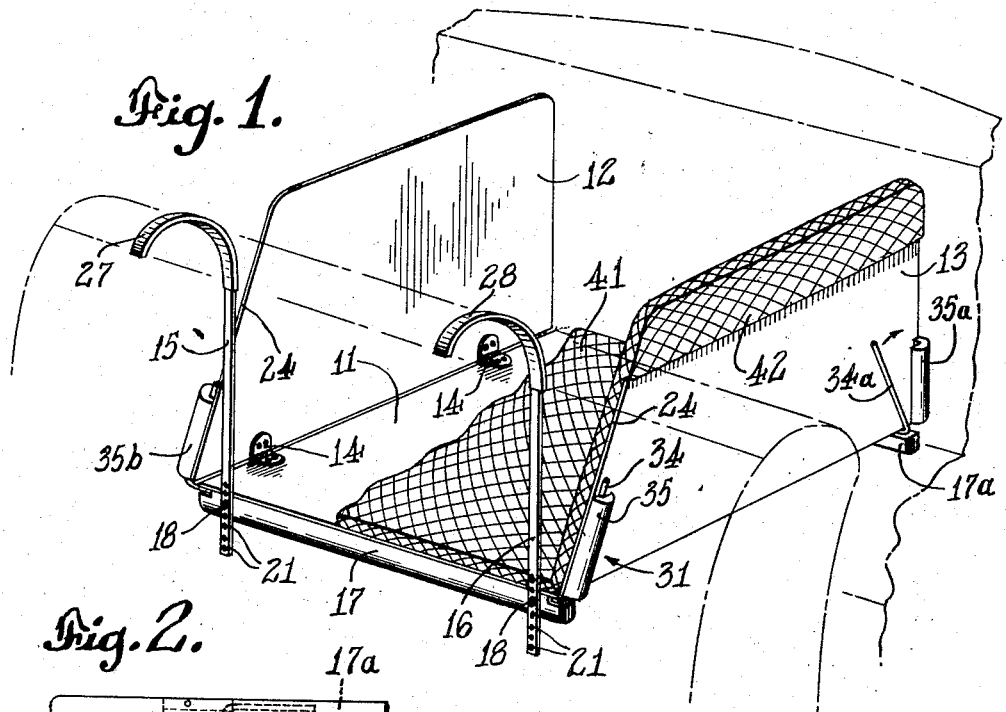
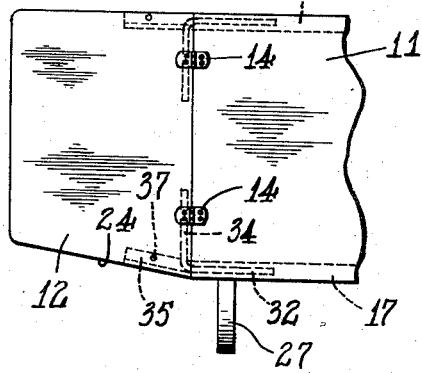
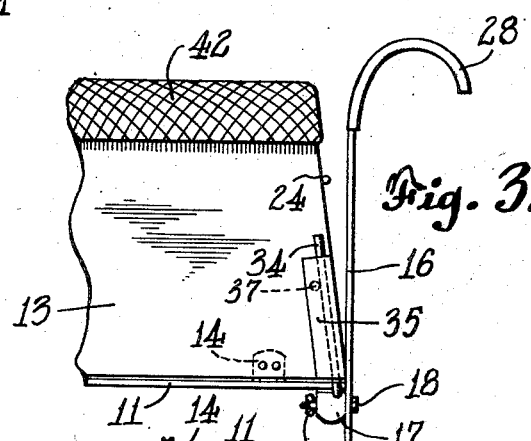
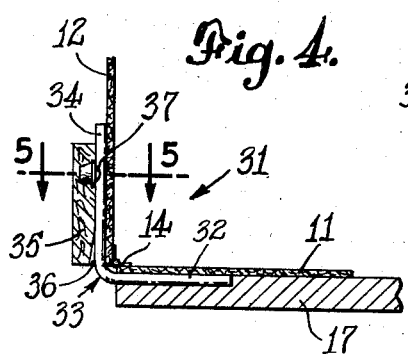
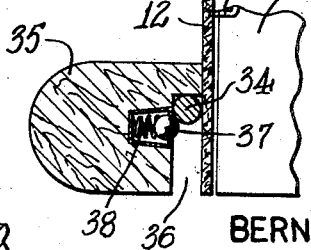
INVENTOR
BERNARD SCHIFFMAN
BY
ATTORNEY United States Patent Office 2,869,144
Patented Jan. 20, 1959

2,869,144

AUTOMOBILE ACCESSORY

Bernard Schiffman, New York, N. Y.

Application September 8, 1953, Serial No. 378,778

13 Claims. (Cl. 5—94)

This invention relates to an automobile accessory useful in adapting the rear seat area of an automobile into more efficient transportation space. More particularly, in one embodiment the invention relates to a combination crib and play area.

The rear seat area of the conventional automobile is designed to accommodate comfortably two or more seated adults. While eminently satisfactory for its intended purpose, this arrangement leaves much to be desired for passengers such as infants or young children. These latter passengers, during wakefulness are denied freedom of movement by the contours and dimensions of the rear seat area. While sleeping, the infant and very young are not properly protected from injury and are in danger of rolling and falling from the seat. Utilization of the area for transporting articles is also inconvenient and inefficient. The lack of a surface that extends over the whole area renders packing and storage of the articles in the area awkward and unsatisfactory.

It is a principal object of the invention to provide safe and comfortable sleeping accommodations in the rear seat of an automobile for infants and young children. A further object is to provide a device which is capable of supplying the sleeping accommodations mentioned above and also capable of being converted into a play area covering substantially all of the rear seat area of an automobile. Still another object of the invention is to provide a device which will convert the rear seat area of an automobile into a compartment convenient and efficient for the transportation of inanimate objects.

The manner in which these objects are accomplished will be explained with reference to the accompanying drawing.

In the drawing:

Fig. 1 is a perspective view, parts being broken away, of the automobile accessory of the invention as it looks in place and functioning as a crib;

Fig. 2 is a top view of a portion of the automobile accessory of the invention as it looks when used as a play area or a storage base;

Fig. 3 is a side view, parts being broken away, of the automobile accessory of the invention shown in Fig. 1;

Fig. 4 is a sectional view of one of the locking devices of the preferred automobile accessory of the invention;

Fig. 5 is a sectional view of the locking device of the invention taken along the line 5—5 of Fig. 4.

The preferred embodiment of the invention comprises a base piece 11 to which is attached two side members 12 and 13. These side members 12 and 13 are attached to opposite side of the base piece 11 in such a manner that the side members may be rotated from the plane of the base piece to a position substantially perpendicular to the base piece. Hinges 14 are a suitable means for attaching the side members 12 and 13 to the base piece 11 in the desired manner.

Conveniently, the base piece 11 is supported by the hooks 15 and 16 that extend upward from the plane of the base piece and are adapted to engage the back of the front seat of an automobile. If the hooks are of metal, as is preferred, protective jackets 27 and 28, suitably of a plastic, may be used to protect the upholstery of the automobile. The hooks 15 and 16 are attached, for example, by the bolts 18 and nuts 19 to a depending member 17 which is secured to the base piece 11. A series of holes 21 in the hooks 15 and 16 permit the adjustment of these members to various heights by means of the bolts 18 and nuts 19. Legs, not shown, extending downwardly from base piece 11 are another convenient means of supporting the base piece.

The side members 12 and 13 are adapted to be secured in a position substantially perpendicular to the base piece 11. A preferred means of securing the side members 12 and 13 in the prescribed position is the locking device 31. In the locking device 31, one arm 32 of a right angle member 33 fits into a groove between the base piece 11 and the downwardly depending member 17 or 17a. The arm 34 of the right angle member 33 is rotatable about the arm 32 from a position substantially in the plane of the base piece 11 to a position substantially perpendicular to the base piece 11 as is indicated by the arrow on the arm 34a. The stop 35 is provided with a groove 36 to receive the arm 34. The arm 34 is held in the groove 36 suitably by the ball 37 actuated by the spring 38 which is recessed in the stop 35.

The downwardly depending member 17a, located near the side of the base piece 11 which is most distant from the hooks 15 and 16, reduces the tendency of the base piece to tip when weight is placed on the base piece 11 in the area above the member 17a. The tendency of the base piece 11 to tip under the prescribed conditions is attributable to the fact that conventional automobile seats slope downward toward the rear of the automobile.

A resilient pad 41 provides added protection for the infant or child using the automobile accessory of the invention as a crib or play area. The pad 41 is conveniently held in place by providing pockets 42 into which a portion, at least, of the side members 12 and 13 extend.

The side members 12 and 13 are movable separately into the same plane as that of the base piece 11. With both of the side members 12 and 13 extended horizontally, as is side member 12 in Fig. 2, substantially the whole of the rear seat area is covered. Preferably the stop 35 extends along the side member 13 to the line of intersection of side member 13 and the base member 11. When the side member 13 is lowered, stop 35 abuts depending member 17 and assists in holding side member 13 in a substantially horizontal position. This relationship may be repeated with stops 35a and 35b and depending members 17a and 17 respectively if desired. In this manner the automobile accessory of the invention may be utilized as a play area by children or as a baggage carrier. The sloping edges 24 on the side members 12 and 13 insure the maximum utilization of the conventional rear seat area and minimize the space between the back of the front seat and the accessory of the invention.

By positioning one of the side members horizontally and the other vertically, a considerable area is made available for storage or play and the uncovered portion of the seat may be occupied by a passenger. The side members preferably may be folded inwardly upon the base member 11 to present a minimum volume when the automobile accessory of the invention is to be stored.

In the event that the crib is not desired, certain of the advantages of the invention may be obtained by having fewer than the three plane surfaces shown in Fig. 1. For example, two plane surfaces hinged, provided with depending members and supported by hooks would serve as a play and storage area. Other modifications of the accessory within the scope of the invention will occur to those skilled in the art. The unit may of course be used with or without end pieces or a covering.

I claim:

1. An automobile accessory adaptable for use as a crib and play area, said accessory comprising a base member, side members mounted on opposite sides of said base member and movable with respect to said base member from a position substantially coextensive with said base member to a position above and substantially perpendicular to said base member, locking means to hold said side members perpendicular to said base member, suspending means extendable above said base member from one end of said base member and adapted to engage the upright portion of the front seat of an automobile, a depending member adjacent the other end of said base member extending below said base member, a stop extending from each of said side members and abutting said depending member when said base member and said side member are coextensive, said locking means comprising two arms substantially perpendicular to each other, one of said arms being mounted to rotate only about its own axis on said base member, the other of said arms being rotatable only about the axis of said mounted arm, a slot in said stop and a closure for said slot whereby said rotatable arm may be retained in said slot when said side member is substantially perpendicular to said base member.

2. An automobile accessory adaptable for providing a variable enclosed horizontal surface in the area between the vertical members of the front and rear automobile seats comprising a primary substantially horizontal panel adapted to rest on said rear seat having a front edge adjacent and generally parallel to said vertical front seat member, a rear edge adjacent and generally parallel to said vertical rear seat member, and a pair of side edges joining said front and rear edges; supporting means adjacent said front edge adapted to support said primary panel in cooperation with said rear seat in substantially horizontal position; a side panel pivotally mounted adjacent one side edge of said primary panel; sustaining means other than pivoting means and supported only by said panels for maintaining said side panel rigid relative to said primary panel when said side panel extends outwardly from and is in the same plane as said primary panel; and locking means to lock said side panel in substantially vertical position extending upwardly from said horizontal panel, said locking device comprising two arms angularly disposed relative to each other, one of said arms mounted to rotate only about its own axis on said primary panel, the other of said arms being rotatable only about the axis of said mounted arm in a plane immediately adjacent the outward surface of said side panel in said substantially vertical position whereby said other arm is rotatable into a locking position for said side panel.

3. An automobile accessory as claimed in claim 2 wherein said sustaining means is secured to said primary panel and cooperates with said side panel to maintain said panels rigid relative to one another.

4. An automobile accessory adaptable for providing a variable enclosed horizontal surface in the area between the vertical members of front and rear automobile seats comprising a primary substantially horizontal panel adapted to rest on said rear seat having a front edge adjacent and generally parallel to said vertical front seat member, a rear edge adjacent and generally parallel to said vertical rear seat member, and a pair of side edges joining said front and rear edges, supporting means adjacent said front edge adapted to support said primary panel in cooperation with said rear seat in substantially horizontal position; a side panel pivotally mounted adjacent one side edge of said primary panel; locking means to lock said side panel in substantially vertical position extending upwardly from said horizontal panel, said locking means comprising two arms substantially perpendicular to each other, one of said arms being mounted to rotate only about its own axis on said primary panel, the other of said arms being rotatable only about the axis of said mounted arm in a plane immediately adjacent the outward surface of said side panel in said substantially vertical position whereby said other arm is rotatable into a locking position for said side panel.

5. An automobile accessory adaptable for providing a variable enclosed horizontal surface in the area between the vertical members of the front and rear automobile seats comprising a primary substantially horizontal panel adapted to rest on said rear seat having a front edge adjacent and generally parallel to said vertical front seat member, a rear edge adjacent and generally parallel to said vertical rear seat member, and a pair of side edges joining said front and rear edges; supporting means engaged adjacent said front edge adapted to support said primary panel in cooperation with said rear seat in substantially horizontal position; a side panel pivotally mounted adjacent each side edge of said primary panel; a primary depending member mounted beneath said primary panel adjacent said front edge and presenting a first abutting facet parallel and adjacent to each said side edge of said primary panel; a primary stop member mounted on each said side panel and presenting a second abutting facet, said primary stop members depending from the corresponding side panels and said second facets being flush against the corresponding first facets when said side panels extend outwardly from and are in the same plane as said primary panel, a pair of locking devices to lock said side panels in substantially vertical positions extending upwardly from said horizontal panel, each said locking device comprising two arms substantially perpendicular to each other, one of said arms being mounted near the associated side on said primary panel to rotate only about its own axis, the other of said arms being rotatable only about the axis of said mounted arm, and a catch on each side panel adapted to receive and retain said other associated arm.

6. An automobile accessory as claimed in claim 5 wherein said supporting means are a pair of spaced elongated members which are attached adjacent said front edge and extend therefrom upwardly and over the top of said vertical front seat member.

7. An automobile accessory as claimed in claim 5 wherein each of said side panels is capable of pivoting through substantially 180° from a position extending outwardly from and in the same plane as said primary panel to a position substantially parallel to and above said primary panel.

8. An automobile accessory as claimed in claim 5 wherein said mounted arms are each positioned in an associated end of said primary depending member, and the catch for said other arm is provided in associated stop members.

9. An automobile accessory as claimed in claim 5 wherein said one arm extends beyond the associated side on said primary panel to also support said associated side panel when in said same plane as said primary panel.

10. An automobile accessory as claimed in claim 5 additionally comprising a secondary depending member mounted beneath said primary panel adjacent rear edge and presenting a third abutting facet parallel and adjacent to each said side edge of said primary panel, and a secondary stop member mounted on each side panel and presenting a fourth abutting facet, said secondary stop members depending from the corresponding side panels and said fourth facets being flush against the corresponding third facets when said side panels are coextensive with and in the same plane as said primary panel.

11. An automobile accessory as claimed in claim 5 wherein said catch comprises a slot and a closure for said slot.

12. An automobile accessory as claimed in claim 10 wherein there are four sets of said locking devices, said rotatable arms being mounted in associated ends of said primary and secondary depending members and said corresponding four catches being provided in associated stop members.

13. An automobile accessory as claimed in claim 11 wherein said closure is spring actuated.

References Cited in the file of this patent

UNITED STATES PATENTS

| | | |
|---|---|---|
| 322,868 | Thayer | July 21, 1885 |
| 711,824 | Claflin | Oct. 21, 1902 |
| 1,060,637 | Sawyer | May 6, 1913 |
| 1,069,932 | Dupart | Aug. 12, 1913 |
| 1,081,831 | Hovorka | Dec. 16, 1913 |
| 1,238,480 | Austin | Aug. 28, 1917 |
| 2,503,602 | Titley | Apr. 11, 1950 |
| 2,606,328 | Finkle | Aug. 12, 1952 |
| 2,634,432 | Ehrenberg | Apr. 14, 1953 |
| 2,637,857 | Isaacson | May 12, 1953 |
| 2,711,545 | Moore | June 28, 1955 |

FOREIGN PATENTS

| | | |
|---|---|---|
| 458,506 | Canada | Aug. 2, 1949 |